Patented May 25, 1937

2,081,506

UNITED STATES PATENT OFFICE 2,081,506

PROCESS FOR PRODUCING ALIPHATIC CARBONYL COMPOUNDS

Hermann Prückner, Chemnitz, Germany, assignor, by mesne assignments, to Böhme Fettchemie-Gesellschaft mit beschrankter Haftung, Chemnitz, Germany No Drawing. Application September 23, 1933, Serial No. 690,768. In Germany July 15, 1931

5 Claims. (Cl. 260—138)

This invention relates to a process for treating the salts of fatty acids to produce aliphatic carbonyl compounds, and has for its object an increase in the quantity of yield and an improvement in the purity of the material obtained.

This application is a continuation-in-part of my prior application Serial No. 617,686, filed June 16, 1932, the latter application being directed primarily to processes for producing alcohols from the fatty acid salts. Thus in my prior application it is pointed out that the conversion of the calcium salts of the higher fatty acids having at least two carbon atoms and of formic acid, and the catalytic hydrogenation of the resulting aldehydes of the fatty series may be effected simultaneously with the result that primary alcohols of unusual purity are produced in abundant yield. The reaction of the calcium salts is furthered and brought to a complete termination by the continuous removal during the process of the aldehydes as the result of the simultaneous conversion of the latter to alcohols by catalytic reduction. Thus the equilibrium of the aldehyde formation reaction is continuously disturbed and the reaction may be carried out under milder conditions and much more completely than is possible when the aldehydes and the alcohols are produced by separate processes.

In this manner the calcium salt of lauric acid may be converted successively and continuously to lauric aldehyde and lauric alcohol, and calcium stearate may be converted through the stearic aldehyde to stearic alcohol in a single process.

The process may be carried out either at atmospheric or at elevated pressure, for instance at about 100 to 200 atmospheres, and the temperature is preferably maintained between the approximate limits of 150° C. and 400° C. It is further found that the presence of a solvent such as tetralin, dodecane, or butyl alcohol favors to a very material extent the formation of the aldehyde, and preferably the solvent used is the alcohol comprising the end product of the reaction. For instance, in the treatment of calcium laurinate the preferred solvent is lauric alcohol, the process being thereby simplified by the elimination of the final step of separating the solvent from the end product.

Any well-known simple or compound hydrogenating catalyst may be used in the production of the alcohols, either alone or precipitated on a suitable carrier and with or without previous reduction, such for example as copper, nickel, cobalt, catalysts and their combinations with one another or with chromium and other known activating agents.

However, if the catalyst is omitted in carrying out the process, the aldehyde corresponding to the fatty acid salt employed is obtained in very great yield, it being unnecessary to provide an atmosphere of hydrogen. The improved results are due primarily to the use of the solvent beforementioned, the reaction proceeding much more smoothly even at temperatures far below those heretofore employed, and a higher yield resulting.

Alternatively, the formates may be omitted or replaced by the salts of other fatty acids, in which event the reaction results in the production in excellent yield of the simple or mixed ketones.

It is also proposed to further modify the hereinbefore described process of obtaining either the aldehydes or the ketones from the fatty acids by the substitution for the calcium salts of the fatty acids employed or of the formic acid, of the corresponding salts of the alkali metals or the alkaline-earth metals, for instance sodium, barium, strontium, potassium or magnesium. The heavy metal salts such as zinc, nickel, or copper soaps may be employed. Likewise, mixtures of the fatty acids or of formic acid with various bases can be utilized, the process in each instance being preferably carried out in the manner described as suitable when the calcium salts are employed.

The following examples serve to illustrate the practical application of the principles of the invention:

Example I 5 grams of sodium stearate and 1.8 grams of calcium formate are dissolved in 10 grams of cyclohexane with the application of moderate heat. The solution is then heated in a closed reaction vessel to approximately 300° C., the pressure rising during the heating to about 30 atmospheres. This temperature is maintained for approximately two hours and the material then allowed to cool. As a reaction product a high yield of stearin aldehyde is obtained which may be isolated by distilling off the cyclohexane which is used as a solvent. Alternatively water or other solvents may be employed, and by proceeding in precisely the same manner, simple or mixed ketones can be obtained as the reaction product if the formates are omitted or are replaced by other fatty acid salts.

Example II 5 grams of sodium palmitate and 1.8 grams of calcium formate are dissolved in 10 grams of cyclohexane and the procedure outlined in Example I is followed.

*Example III*

50 parts by weight of the calcium salt of coconut fatty acid, 18 parts by weight of calcium acetate and 200 parts by weight of benzene are agitated in an autoclave. The mixture is heated to 330° C., the pressure rising as a consequence of the increase in temperature to 25 atmospheres, and this temperature is maintained for an hour. The material is then permitted to cool and the reaction product is decomposed with hydrochloric acid, etherized out, and the ethereal solution dried and the ether distilled off. According to analysis the residue consists of 50% ketone which corresponds predominantly to the formula,

$$CH_3CO(CH_2)_{10}CH_3.$$

*Example IV*

50 parts by weight of calcium caprinate, 18 parts by weight of calcium acetate and 200 parts by weight of benzene are treated as indicated in Example III with analogous results.

*Example V*

50 parts by weight of the calcium salts of coconut fatty acid, 18 parts by weight of barium acetate and 200 parts by weight of benzene are agitated and otherwise treated as indicated in Example III. The ketone is produced in excellent yield.

Having thus described the invention, what is claimed as new and desired to be secured by Letters Patent is:

1. A process for producing aliphatic carbonyl compounds which comprises heating a solution in an inert organic solvent of a calcium salt of a fatty acid and calcium formate.

2. A process for producing aliphatic carbonyl compounds which comprises heating a solution in an inert organic solvent of a calcium salt of a fatty acid and calcium formate and supplying pressure in excess of 100 atmospheres thereto.

3. A process for producing aliphatic carbonyl compounds which comprises heating a solution in an inert organic solvent of a calcium salt of a fatty acid and calcium formate to a temperature between 150° and 400° C.

4. A process of producing aldehydes comprising heating a solution in an inert organic solvent of an alkaline-earth metal salt of a fatty acid having at least two carbon atoms and an alkaline-earth metal salt of formic acid.

5. A process of producing aldehydes which comprises heating a solution in an inert organic solvent of a salt selected from the group consisting of alkali metal salts, alkaline-earth metal salts and heavy metal salts of a fatty acid having at least two carbon atoms and a salt of formic acid to a temperature approximating 150° C. to 400° C.

HERMANN PRÜCKNER.